US009810555B2

United States Patent
Ishizuka

(10) Patent No.: US 9,810,555 B2
(45) Date of Patent: Nov. 7, 2017

(54) ABSOLUTE ENCODER THAT PROVIDES INCREASED ACCURACY AGAINST DEFECT IN SCALE THEREOF

(71) Applicant: CANON KABUSHIKI KAISHA, Tokyo (JP)

(72) Inventor: Ko Ishizuka, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 148 days.

(21) Appl. No.: 14/689,329

(22) Filed: Apr. 17, 2015

(65) Prior Publication Data
US 2015/0300847 A1 Oct. 22, 2015

(30) Foreign Application Priority Data

Apr. 21, 2014 (JP) .................. 2014-087591

(51) Int. Cl.
*G01D 5/347* (2006.01)
*G01D 5/244* (2006.01)
(Continued)

(52) U.S. Cl.
CPC ....... *G01D 5/34776* (2013.01); *G01D 5/2455* (2013.01); *G01D 5/2492* (2013.01);
(Continued)

(58) Field of Classification Search
CPC ........... G01D 5/34776; G01D 5/24466; G01D 5/2455; G01D 5/24471; G01D 8/2495;
(Continued)

(56) References Cited

U.S. PATENT DOCUMENTS 4,879,671 A * 11/1989 Rieder ............... G01D 5/24452
250/231.1
4,914,437 A * 4/1990 Kibrick ................. H03M 1/308
250/231.18
(Continued)

FOREIGN PATENT DOCUMENTS

DE 19506019 A1 9/1996
EP 1403623 A1 3/2004
(Continued)

OTHER PUBLICATIONS

Extended European Search Report issued in EP15001094.0, dated Sep. 24, 2015.
(Continued)

*Primary Examiner* — Que T Le
*Assistant Examiner* — Jennifer Bennett
(74) *Attorney, Agent, or Firm* — Rossi, Kimms & McDowell LLP

(57) ABSTRACT

There is provided an absolute encoder advantageous in accuracy of an output thereof against a defect in a scale thereof. In the absolute encoder, a detector detects a part of an array of marks of the scale, and outputs a data sequence corresponding to the part. A processor stores information indicating a correspondence between each of a plurality of code sequences and an absolute coordinate of motion of the scale, and outputs information of the absolute coordinate based on the data sequence and the information. The processor detects an error of the data sequence, and performs rewriting of the information based on the detected error.

10 Claims, 11 Drawing Sheets

(51) Int. Cl.
  *G01D 5/245* (2006.01)
  *G01D 5/249* (2006.01)

(52) U.S. Cl.
  CPC ....... *G01D 5/2495* (2013.01); *G01D 5/24466* (2013.01); *G01D 5/24471* (2013.01); *G01D 5/24495* (2013.01); *G01D 5/34715* (2013.01); *G01D 5/34746* (2013.01); *G01D 5/34792* (2013.01)

(58) Field of Classification Search
  CPC ............. G01D 5/2492; G01D 5/34792; G01D 5/34746; G01D 5/34715
  USPC ......... 250/231.1, 231.14, 221; 356/614, 616, 356/615, 617, 621, 622; 33/1 M, 1 N, 33/1 L; 341/11, 13
  See application file for complete search history.

(56) References Cited

U.S. PATENT DOCUMENTS

| | | | | |
|---|---|---|---|---|
| 6,127,948 A * | 10/2000 | Hillis | ............... | H03M 1/282 341/3 |
| 6,987,465 B2 | 1/2006 | Mittmann | | |
| 7,565,256 B2 * | 7/2009 | Kusano | ............... | G01D 5/34792 702/117 |
| 7,663,093 B2 * | 2/2010 | Kusano | ................ | G01D 5/2455 250/231.13 |
| 7,770,304 B2 | 8/2010 | Oberhauser et al. | | |
| 2004/0173735 A1 * | 9/2004 | Williams | ........... | G01D 5/34792 250/231.13 |
| 2012/0032068 A1 | 2/2012 | Ishizuka | | |
| 2012/0072169 A1 * | 3/2012 | Gribble | .............. | G01D 5/24461 702/150 |

FOREIGN PATENT DOCUMENTS

| | | |
|---|---|---|
| EP | 1876424 A2 | 1/2008 |
| EP | 2072965 A2 | 6/2009 |
| JP | 03274414 A | 12/1991 |
| JP | 2012037392 A | 2/2012 |

OTHER PUBLICATIONS

Intent to Grant issued in European Appln. No. 15001094.0 dated Mar. 16, 2017.

* cited by examiner

FIG. 4B

| COLLATION AT TIME T3 | CODED DATA (18 BITS) AT TIME T3 | | | | | | | | | | | | | | | | | | REWRITING COUNT COUNTER |
|---|---|---|---|---|---|---|---|---|---|---|---|---|---|---|---|---|---|---|---|
| | 1 | 1 | 0 | 1 | 0 | 1 | 1 | 0 | 1 | 0 | 0 | 1 | 0 | 1 | 1 | 0 | 1 | 0 | |
| ADDRESS | REFERENCE DATA | | | | | | | | | | | | | | | | | | |
| 1 | | | | | | | | | | | | | | | | | | | 0 |
| 2 | | | | | | | | | | | | | | | | | | | 0 |
| ... | | | | | | | | | | | | | | | | | | | |
| 1234 | 0 | 0 | 1 | 1 | 0 | 0 | 1 | 0 | 1 | 1 | 0 | 0 | 1 | 0 | 1 | 1 | 0 | 0 | 0 |
| 1235 | 0 | 1 | 1 | 0 | 0 | 1 | 0 | 1 | 1 | 0 | 0 | 1 | 0 | 1 | 1 | 0 | 0 | 1 | 0 |
| 1236 | 1 | 1 | 0 | 0 | 1 | 0 | 1 | 1 | 0 | 0 | 1 | 0 | 1 | 1 | 0 | 0 | 1 | 1 | 0 |
| 1237 | 1 | 0 | 0 | 1 | 0 | 1 | 1 | 0 | 0 | 1 | 0 | 1 | 1 | 0 | 0 | 1 | 1 | 0 | 0 |
| 1238 | 0 | 0 | 1 | 0 | 1 | 1 | 0 | 0 | 1 | 0 | 1 | 1 | 0 | 0 | 1 | 1 | 0 | 1 | 0 |
| 1239 | 0 | 1 | 0 | 1 | 1 | 0 | 0 | 1 | 0 | 1 | 1 | 0 | 0 | 1 | 1 | 0 | 1 | 0 | 0 |
| 1240 | 1 | 0 | 1 | 1 | 0 | 0 | 1 | 0 | 1 | 1 | 0 | 0 | 1 | 1 | 0 | 1 | 0 | 1 | 1 |
| 1241 | 1 | 1 | 1 | 0 | 0 | 1 | 0 | 1 | 1 | 0 | 0 | 1 | 1 | 0 | 1 | 0 | 1 | 1 | 0 |
| 1242 | 0 | 0 | 0 | 1 | 0 | 0 | 1 | 1 | 0 | 0 | 1 | 1 | 1 | 1 | 0 | 1 | 1 | 0 | 0 |
| 1243 | 0 | 1 | 1 | 0 | 1 | 1 | 1 | 0 | 0 | 1 | 1 | 1 | 1 | 0 | 1 | 1 | 0 | 1 | 0 |
| 1244 | 1 | 0 | 1 | 1 | 1 | 1 | 0 | 0 | 1 | 1 | 1 | 1 | 0 | 1 | 1 | 0 | 1 | 1 | 0 |
| 1245 | 0 | 1 | 0 | 0 | 1 | 0 | 1 | 1 | 1 | 0 | 1 | 0 | 1 | 1 | 0 | 0 | 1 | 0 | 0 |
| 1246 | 1 | 0 | 0 | 1 | 0 | 1 | 1 | 1 | 0 | 1 | 0 | 1 | 1 | 0 | 0 | 1 | 0 | 1 | 1 |
| 1247 | 0 | 0 | 1 | 0 | 1 | 1 | 1 | 0 | 1 | 0 | 1 | 1 | 0 | 0 | 1 | 0 | 1 | 1 | 0 |
| 1248 | 1 | 1 | 0 | 0 | 1 | 1 | 0 | 1 | 0 | 1 | 0 | 0 | 1 | 0 | 1 | 1 | 0 | 0 | 0 |
| 1249 | 1 | 0 | 0 | 1 | 1 | 0 | 1 | 0 | 1 | 0 | 0 | 1 | 0 | 1 | 1 | 0 | 0 | 0 | 0 |
| 1250 | 0 | 0 | 1 | 1 | 0 | 1 | 0 | 1 | 0 | 0 | 1 | 0 | 1 | 1 | 0 | 0 | 0 | 0 | 0 |
| 1251 | 0 | 1 | 1 | 0 | 1 | 0 | 1 | 0 | 0 | 1 | 0 | 1 | 1 | 0 | 0 | 0 | 0 | 1 | 0 |
| 1252 | 1 | 1 | 0 | 1 | 0 | 1 | 0 | 0 | 1 | 0 | 1 | 1 | 0 | 0 | 0 | 0 | 1 | 1 | 0 |
| 1253 | 0 | 0 | 1 | 0 | 1 | 0 | 0 | 1 | 0 | 1 | 1 | 0 | 0 | 0 | 0 | 1 | 1 | 0 | 0 |
| 1254 | 1 | 1 | 0 | 1 | 0 | 0 | 1 | 0 | 1 | 1 | 0 | 0 | 0 | 0 | 1 | 1 | 0 | 1 | 0 |
| 1255 | 0 | 1 | 1 | 0 | 0 | 1 | 0 | 1 | 1 | 0 | 0 | 0 | 0 | 1 | 1 | 0 | 1 | 0 | 0 |
| 1256 | 0 | 1 | 0 | 0 | 1 | 0 | 1 | 1 | 0 | 0 | 0 | 0 | 1 | 1 | 0 | 1 | 0 | 1 | 0 |
| 1257 | 1 | 1 | 0 | 1 | 0 | 1 | 1 | 0 | 0 | 0 | 0 | 1 | 1 | 0 | 1 | 0 | 1 | 1 | 0 |
| 1258 | 1 | 0 | 1 | 0 | 1 | 1 | 0 | 0 | 0 | 0 | 1 | 1 | 0 | 1 | 0 | 1 | 1 | 0 | 0 |
| 1259 | 1 | 1 | 0 | 1 | 1 | 0 | 0 | 0 | 0 | 1 | 1 | 0 | 1 | 0 | 1 | 1 | 0 | 1 | 0 |
| ... | | | | | | | | | | | | | | | | | | | |
| 65536 | | | | | | | | | | | | | | | | | | | 0 |

SEARCH REGION

F I G. 5B

FIG. 6A COLLATION AT TIME T4

| ADDRESS | CODED DATA (18 BITS) AT TIME T4 <br> 1 0 0 1 0 1 0 1 1 0 1 1 0 1 0 1 0 0 | REWRITING COUNT COUNTER |
|---|---|---|
| | REFERENCE DATA | |
| 1 | 0 0 1 1 0 0 1 1 0 1 1 0 0 1 1 0 0 1 | 0 |
| 2 | 0 0 1 1 0 0 1 1 0 1 1 0 0 1 1 0 0 1 | 0 |
| ... | | |
| 1234 | 1 1 0 0 1 1 0 0 1 1 0 0 1 1 0 0 1 1 | 0 |
| 1235 | 1 0 0 1 1 0 0 1 1 0 0 1 1 0 0 1 1 0 | 0 |
| 1236 | 0 0 1 1 0 0 1 1 0 0 1 1 0 0 1 1 0 0 | 0 |
| 1237 | 0 1 1 0 0 1 1 0 0 1 1 0 0 1 1 0 0 1 | 0 |
| 1238 | 1 1 0 0 1 1 0 0 1 1 0 0 1 1 0 0 1 1 | 0 |
| 1239 | 1 0 0 1 1 0 0 1 1 0 0 1 1 0 0 1 1 0 | 0 |
| 1240 | 0 0 1 1 0 0 1 1 0 0 1 1 0 0 1 1 0 0 | 0 |
| 1241 | 1 0 0 1 0 1 0 1 1 0 1 1 0 1 0 1 0 0 | 1 |
| 1242 | 0 1 0 1 1 0 1 1 0 1 0 1 0 0 1 0 0 1 | 1 |
| 1243 | 0 1 1 0 1 1 0 1 0 1 0 0 1 0 0 1 1 1 | 1 |
| 1244 | 1 0 1 1 0 1 0 1 0 0 1 0 0 1 1 1 0 1 | 1 |
| 1245 | 0 1 1 0 1 0 1 0 0 1 0 0 1 1 1 0 1 0 | 1 |
| 1246 | 1 0 1 0 1 0 0 1 0 0 1 1 1 0 1 0 1 0 | 1 |
| 1247 | 0 1 0 1 0 0 1 0 0 1 1 1 0 1 0 1 0 0 | 1 |
| 1248 | 1 0 1 0 0 1 0 0 1 1 1 0 1 0 1 0 0 1 | 1 |
| 1249 | 1 1 0 0 1 0 0 1 1 1 0 1 0 1 0 0 1 1 | 1 |
| 1250 | 0 0 1 0 0 1 1 1 0 1 0 1 0 0 1 1 0 0 | 1 |
| 1251 | 1 0 0 1 1 1 0 1 0 1 0 0 1 1 0 0 0 0 | 1 |
| 1252 | 0 0 1 1 1 0 1 0 1 0 0 1 1 0 0 0 0 0 | 1 |
| 1253 | 0 1 1 1 0 1 0 1 0 0 1 1 0 0 0 0 0 0 | 1 |
| 1254 | 1 1 1 0 1 0 1 0 0 1 1 0 0 0 0 0 0 1 | 1 |
| 1255 | 1 1 0 1 0 1 0 0 1 1 0 0 0 0 0 1 1 0 | 1 |
| 1256 | 1 0 1 0 1 0 0 1 1 0 0 0 0 0 1 1 0 1 | 0 |
| 1257 | 0 1 0 1 0 0 1 1 0 0 0 0 0 1 1 0 1 0 | 0 |
| 1258 | 1 1 1 0 0 1 1 0 0 0 0 0 1 1 0 1 0 1 | 0 |
| 1259 | 1 1 0 0 1 1 0 0 0 0 0 1 1 0 1 0 1 1 | 0 |
| ... | | |
| 65536 | | 0 |

SEARCH REGION

F I G. 6B

ABSOLUTE ENCODER THAT PROVIDES INCREASED ACCURACY AGAINST DEFECT IN SCALE THEREOF

BACKGROUND OF THE INVENTION

Field of the Invention

The present invention relates to an absolute encoder.

Description of the Related Art

Conventionally, an absolute encoder is used to measure the stage position of an apparatus. An absolute linear encoder records, on a scale, a pattern made to correspond to codes of 1s and 0s, and optically or electromagnetically detects the pattern. Japanese Patent Laid-Open No. 2012-037392 discloses an absolute encoder adopting a method of arraying, in the moving direction of a scale, a grating whose reflectance changes in correspondence with a code of 1 or 0.

Since the reflectance may change due to the influence of a defect in the scale (dust on the scale, a flaw in the grating, or the like) to cause erroneous code detection, there is known a method of detecting such error and outputting a warning.

In Japanese Patent Laid-Open No. 03-274414, a track is formed by a one-track absolute pattern such that m codes $X_i$ ($i=1, \ldots, m$) detected by m (m is 2 or more) sensors satisfy an equation $f(X_1, \ldots, X_m)$=constant C (f: function). The numerical solution of the equation f is obtained by using the outputs of the sensors, and compared with the constant C. If these values are different from each other, a warning signal is output.

In the method described in Japanese Patent Laid-Open No. 03-274414, it is impossible to acquire correct absolute position information during a period in which a detector passes through an error factor portion. If the error factor portion falls outside a detection region, correct position information is output, as a matter of course. Conventionally, during the period, position information obtained by performing estimation based on speed information and the like is output at best.

SUMMARY OF THE INVENTION

The present invention provides, for example, an absolute encoder advantageous in accuracy of an output thereof against a defect in a scale thereof.

According to one aspect of the present invention, an absolute encoder comprises a scale including an array of marks, a detector configured to detect a part of the array of marks and output a data sequence corresponding to the part, and a processor storing information indicating a correspondence between each of a plurality of code sequences and an absolute coordinate of motion of the scale, and output information of the absolute coordinate based on the data sequence and the information, wherein the processor is configured to detect an error of the data sequence, and perform rewriting of the information based on the detected error.

Further features of the present invention will become apparent from the following description of exemplary embodiments (with reference to the attached drawings).

BRIEF DESCRIPTION OF THE DRAWINGS

Figure 4B:
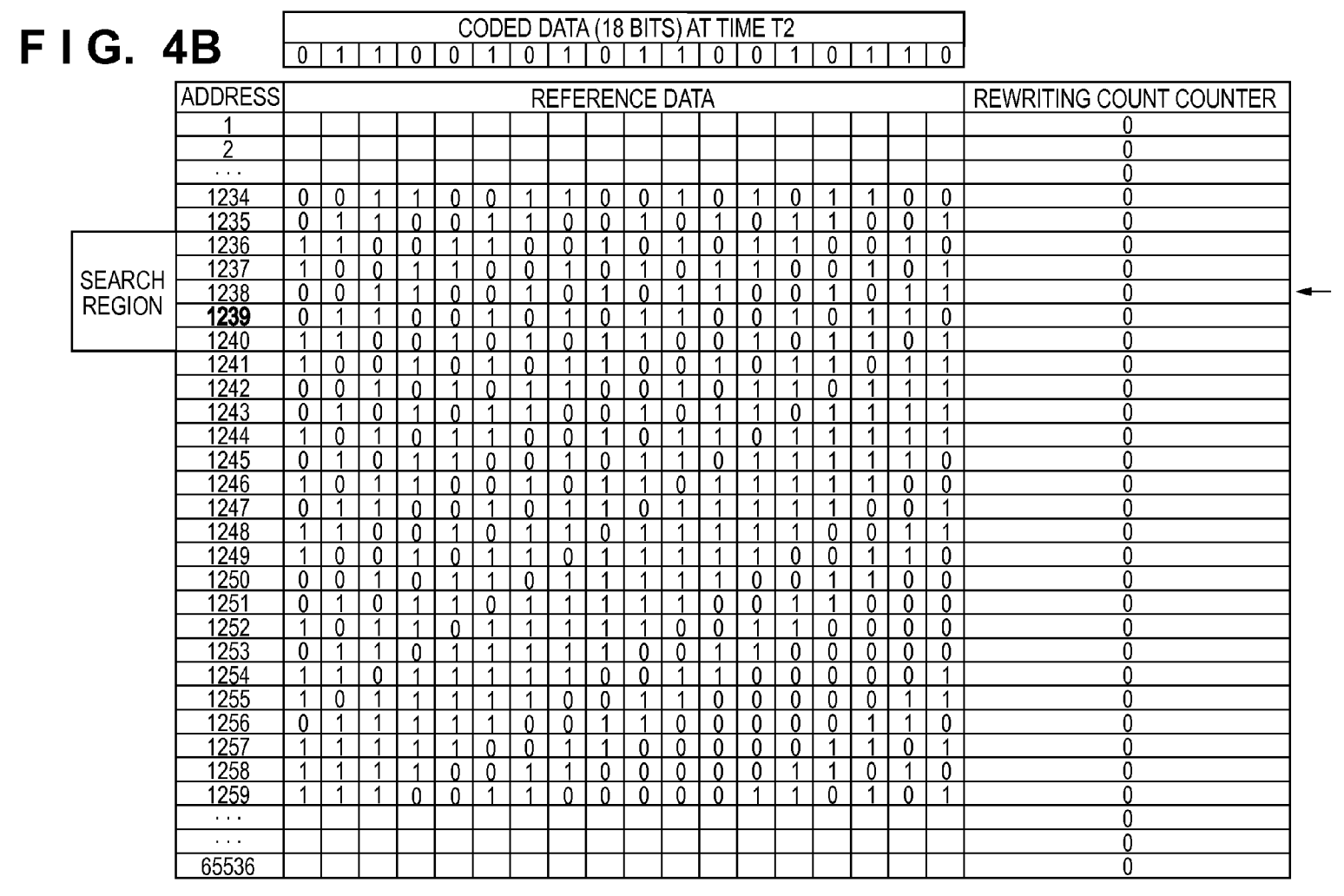

FIGS. 4A and 4B are views for explaining the relationship between a variation in coded data and collated reference data and rewiring of the reference data;

FIGS. 5A and 5B are views for explaining the relationship between a variation in coded data and the collated reference data and rewiring of the reference data;

FIGS. 6A and 6B are views for explaining the relationship between a variation in coded data and the collated reference data and rewiring of the reference data;

DESCRIPTION OF THE EMBODIMENTS

Figure 1:
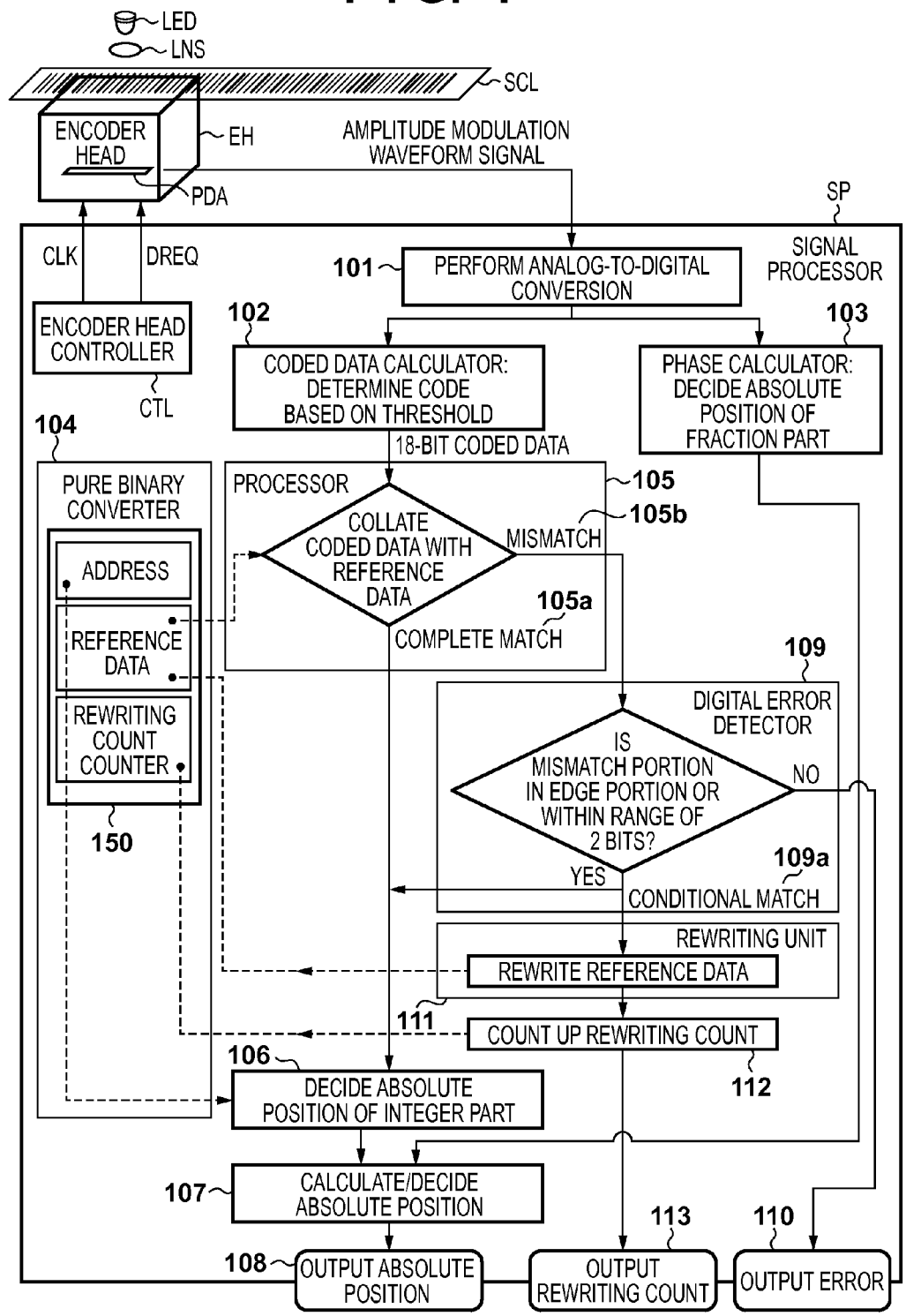
FIG. 1 is a view for explaining the arrangement of an absolute encoder and a signal processing algorithm according to the first embodiment.

Various exemplary embodiments, features, and aspects of the invention will be described in detail below with reference to the drawings.

Embodiments of the present invention will be described in detail below with reference to the accompanying drawings. The present invention is not limited to the following embodiments, and these embodiments are merely practical examples advantageous when carrying out the present invention. Also, not all combinations of features explained in the following embodiments are essential for the present invention to solve the problem. Note that the same reference numerals denote the same members throughout the drawings, and a repetitive description thereof will not be given.

<First Embodiment>

FIG. 1 is a view for explaining the arrangement of an absolute encoder and a signal processing algorithm according to the first embodiment. A light beam emitted by a light-emitting element LED is converted into a collimated light beam by a collimator lens LNS, and illuminates a scale SCL having an array of marks. The array of marks of the scale SCL is represented by, for example, a grating pattern made to correspond to codes of 1s and 0s. The grating pattern is formed depending on the magnitude of the transmittance or reflectance. More specifically, for example, among the transparent portions and non-transparent portions of the grating pattern of the scale SCL, the transparent portions are selectively provided with a semitransparent film. Transmitted light is projected onto a light-receiving element array PDA of an encoder head EH. As a rule for providing a semitransparent film, for example, a 16-bit M-sequence (maximal length sequence) or M-sequence code is used. The encoder head EH functions as a detector which detects part of the array of marks of the scale, and outputs a data sequence corresponding to it. Note that an encoder head controller CTL controls driving of the encoder head EH.

Referring to FIG. 1, an opening in a portion of the scale SCL, where horizontal lines are shown, indicates a semitransparent film. Therefore, a bright/dark pattern whose light amount is partially halved by the semitransparent film is projected onto the light-receiving element array PDA. In the light-receiving element array PDA, 12 elements correspond to one period of the bright/dark pattern. The light-receiving element array PDA receives light for 20 periods. Thus, the light-receiving element array PDA outputs an amplitude modulation periodic signal for 240 elements. The amplitude modulation periodic signal is transferred to a signal processor SP, undergoes analog-to-digital conversion by an analog-to-digital converter 101, and is then transferred to the following two calculation blocks.

After selecting in advance an element corresponding to a local maximum value, a coded data calculator 102 compares the output of the element with a threshold, and calculates a coded data sequence. The coded data sequence is obtained by extracting 18 bits of a central portion of information obtained by demodulating a specific region for 20 bits of the scale in which the grating pattern is formed according to the 16-bit M-sequence code indicating transparent/semitransparent portions. Based on this information, the absolute position information of an integer part is acquired by calculation (to be described later).

A phase calculator 103 calculates the inner products of the periodic signal waveform having undergone amplitude modulation and two reference phase periodic signal waveforms, and obtains the total sum of the inner products. After that, the phase calculator 103 generates incremental encoder A-phase and B-phase signals from the obtained total sum, and obtains a phase θ by performing arc tangent calculation. The phase θ indicates the absolute position information of a fraction part, and serves as an interpolation signal. Note that the present invention relates to code demodulation and thus a description of phase calculation will be omitted.

FIGS. 2A to 2C, 3A, and 3B show a case in which the amplitude modulation periodic signal moves (changes) along with movement of the scale SCL. FIGS. 2A to 3B show an example in which the position of the scale moves leftward by one pitch at times T1, T2, T3, T4, and T5. Since the M-sequence code is directly recorded on the scale, if the scale shifts leftward on the sheet surface by one bit (one grating pitch), the M-sequence code shifts by one bit accordingly. By repeating this operation, the same code sequence is obtained. This is because the M-sequence code is one of cyclic codes. The period length is indicated by 2N by representing the number of bits by N, and adding a code sequence of 0s. Assume that the M-sequence code is a 16-bit M-sequence code, and the pitch of the transparent/non-transparent portions of the scale is 80 μm. In this case, a length of 5.2 m can be represented by 65536 absolute positions in steps of 80 μm. Note that the absolute position information is generally more useful when it is sequentially represented from 0 in the ascending order of 1, 2, 3, . . . , 65536 or in the descending order. In general, therefore, the M-sequence code is converted into a pure binary code, and then output as absolute position information.

A pure binary converter 104 uses a table in which the correspondence between a reference data sequence and the absolute position information of the scale is described for each of a plurality of reference data sequences. This table is stored in a memory 150 serving as a storage unit. Each of the plurality of reference data sequences in the table is a data sequence obtained by sequentially shifting (by, for example, one bit) the M-sequence code in the grating pattern and extracting it. The pure binary converter 104 converts a data sequence into a pure binary by designating an address in the memory 150, and referring to data at the address. For example, the pure binary converter 104 associates the M-sequence code with addresses in the memory. If the M-sequence code is a 16-bit M-sequence code, the number of addresses is 65536.

If, however, dust adheres to the transparent portion of the scale, the amount of transmitted light decreases. Consequently, for example, in a portion where a code of 1 should be originally determined, a code of 0 may be erroneously determined. The relationship between the codes of the erroneously read 16-bit code sequence deviates from the rule of the M-sequence, and the same code sequence also exists in a portion different from the original portion. Therefore, if a method of associating such M-sequence code with the addresses and referring to the data is used, wrong pure binary absolute position information may be output in a flawed or dirty portion. Note that the flawed or dirty portion of the scale is represented by "×" in FIGS. 2A to 2C, 3A, and 3B.

To solve the above problem, the pure binary converter 104 adopts a method of setting absolute position information as an address, and holding code sequence data at the address, as shown in FIGS. 4A to 7. Furthermore, for example, in the initial state, the M-sequence code is stored as code sequence data at an address, and the M-sequence code is partially rewritten according to a rewriting algorithm (to be described later) to allow deviation from the rule of the M-sequence code.

A data processing algorithm according to this embodiment will be described below.

According to a simultaneously calculated phase calculation value, 18 bits of a central portion of demodulated information for 20 bits are selected, and set as code data. The pure binary converter 104 includes, for example, a table which sequentially stores a 16-bit M-sequence code by 18-bit data in correspondence with respective 65536 addresses. Each 18-bit data is set as reference data.

A processor 105 collates the acquired coded data sequence with each reference data sequence. That is, a reference data sequence matching the coded data sequence is searched for. Assume that the processing starts from a portion of the scale where there is no flaw, stain, or dust (see FIG. 2A). In this case, only one completely matched reference data is found (105a), and an address value corresponding to the portion is decided as absolute position information (106). For example, in FIG. 4A corresponding to FIG. 2A, the address of the reference data matching the coded data at time T1 is 1238, and is decided as the absolute position of an integer part. After that, based on the decided absolute position of the integer part and the absolute position of the fraction part decided by the phase calculator 103, the absolute position is calculated and decided (107), and the absolute position information is output (108).

When the absolute encoder is used for control processing, measurement is performed at a given interval. Therefore, for example, a code pattern is read by sampling at an interval of 10 μs. At this time, if the moving amount of the scale within one sampling period is sufficiently small, the next address value should be near the preceding address value. A partial search for a portion where the coded data matches reference data is executed only within a range near the preceding address value. If reference data matching the coded data is found, absolute position information (address value) is output. In general (when there is no flaw or dust), by repeating the above processing, it is possible to output absolute position information at an interval of 10 μs.

Note that if a partial search is executed in five regions within a range of ±2 of the preceding position, it can be completed in about five clocks. For an FPGA calculation system using a 100-MHz clock signal, therefore, the time is about 0.05 μs, thereby exerting no influence on the sampling interval of 10 μs. Note that the search range may be widened, narrowed, or offset based on speed information. FIG. 4B shows a state at next sampling time T2 (see FIG. 2B). Referring to FIG. 4B, as a result of executing a search by setting, as a search region, five regions including the address "1238" of the preceding absolute position, the coded data matches reference data at an address "1239". Therefore, the absolute position information of the integer part indicates 1239.

Figure 2A:
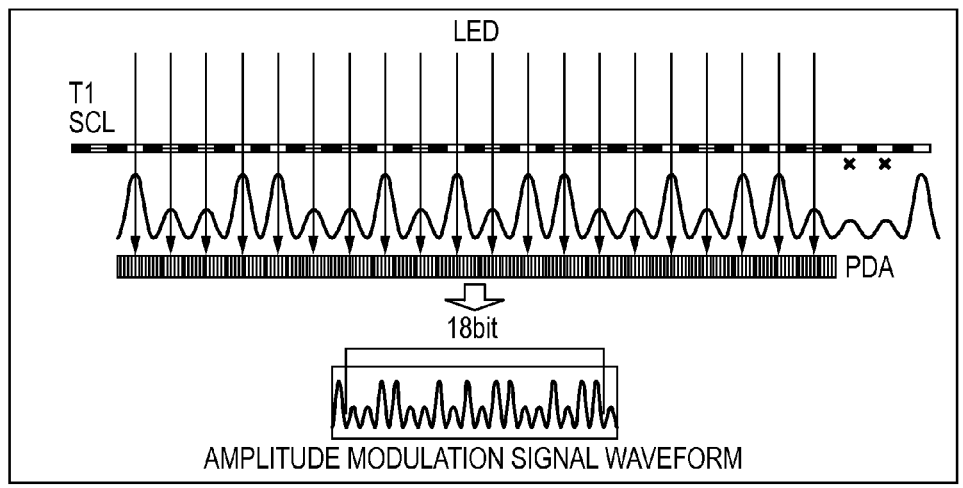
FIGS. 2A to 2C are views for explaining a variation in waveform of a light-receiving element array caused by movement of a scale.
Figure 2B:
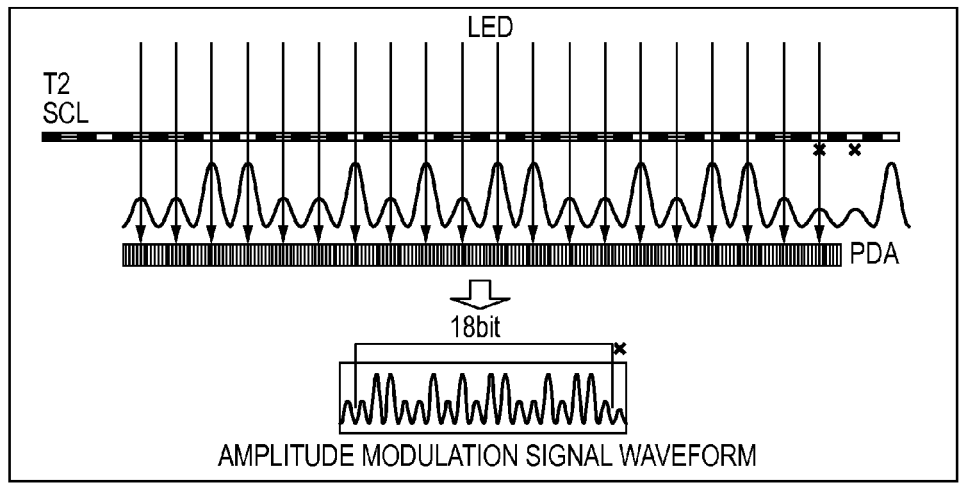
Figure 2C:
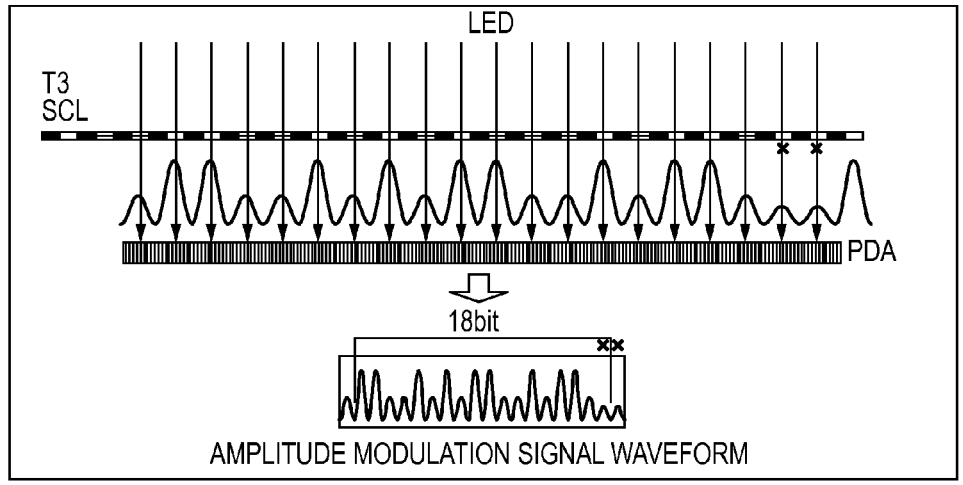
Figure 5A:

As shown in FIGS. 2C and 5A, when the scale includes a defect such as a flaw or dust, no matched reference data is found within the search range even by executing a search. Processing in this case according to this embodiment will be described below with reference to the flowchart shown in FIG. 1.

The signal processor SP includes a digital error detector 109 which detects a digital error of the coded data sequence. The digital error detector 109 can detect an error based on the degree of correlation between the coded data sequence and each reference data sequence. If, for example, the acquired 18-bit coded data sequence does not match a reference data sequence (105*b*), the digital error detector 109 searches for the reference data sequence which does not match the coded data sequence at only a predetermined position. The predetermined position indicates, for example, a position including a predetermined number of bits from the most significant bit (MSB) or least significant bit (LSB) of the reference data sequence. That is, the digital error detector 109 determines whether the mismatch portion is in an edge portion or adjacent to it. If the mismatch portion is in an edge portion or adjacent to it, the digital error detector 109 determines a conditional match (109*a*), and decides the address of the conditional match as absolute position information. On the other hand, if the above condition is not satisfied, the digital error detector 109 sends an error notification indicating that correct position information cannot be output (110).

Figure 5B:
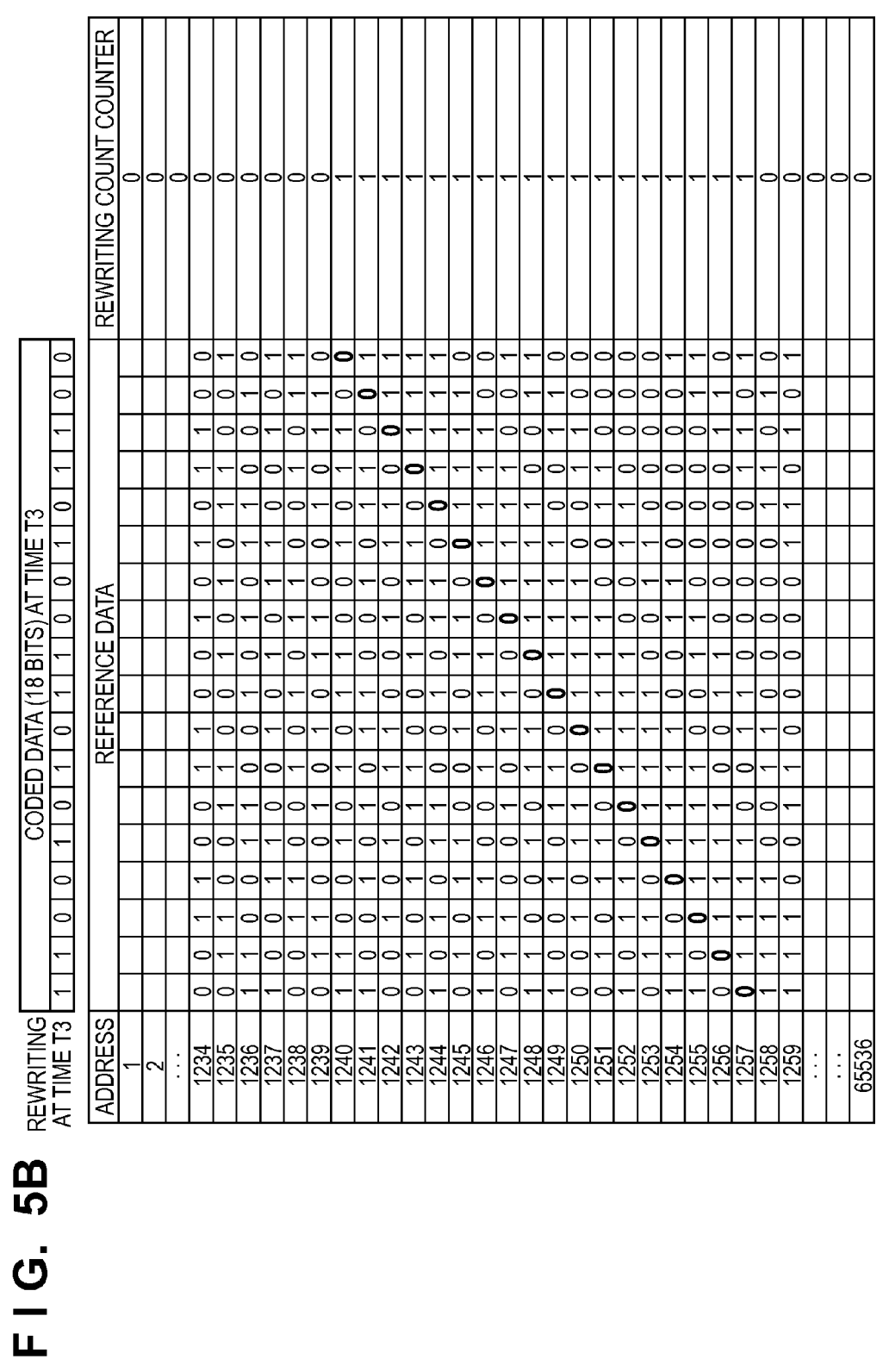

After the absolute position information is decided, a rewriting unit 111 rewrites the reference data at the address of the conditional match by the read data. Furthermore, the rewriting unit 111 completes rewriting of the corresponding portions of the reference data at 18 adjacent addresses before next sampling. FIG. 5B shows this rewriting processing.

Figure 3A:
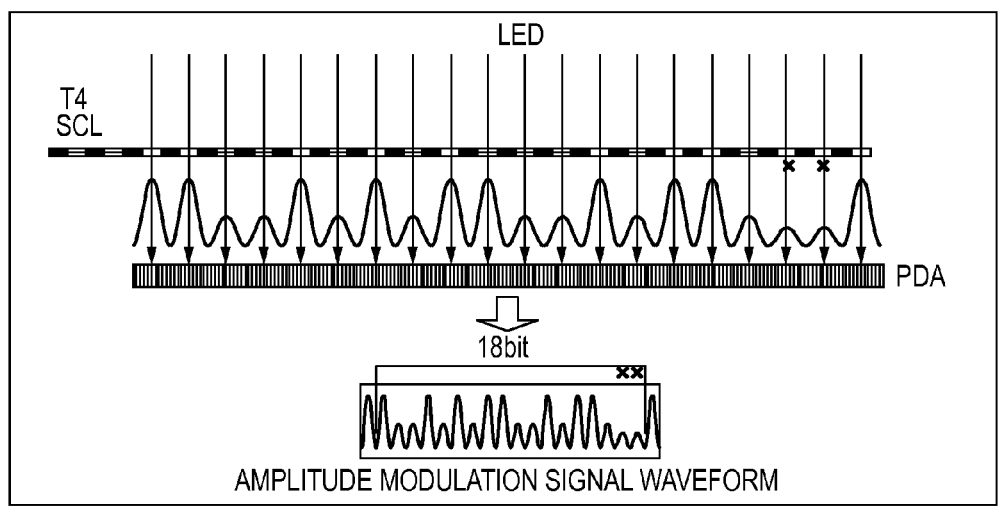
FIGS. 3A and 3B are views for explaining a variation in waveform of the light-receiving element array caused by movement of the scale.
Figure 3B:
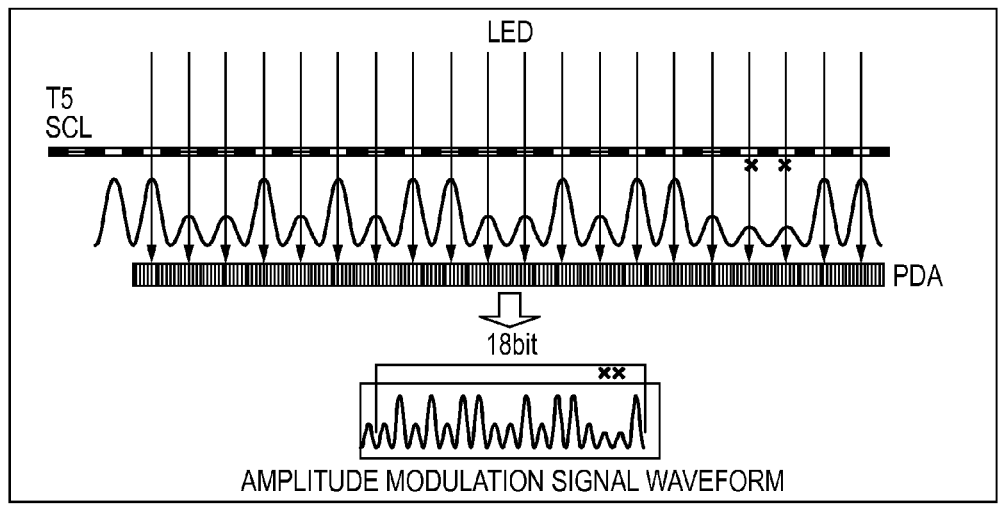
Figure 4A:
Figure 6B:
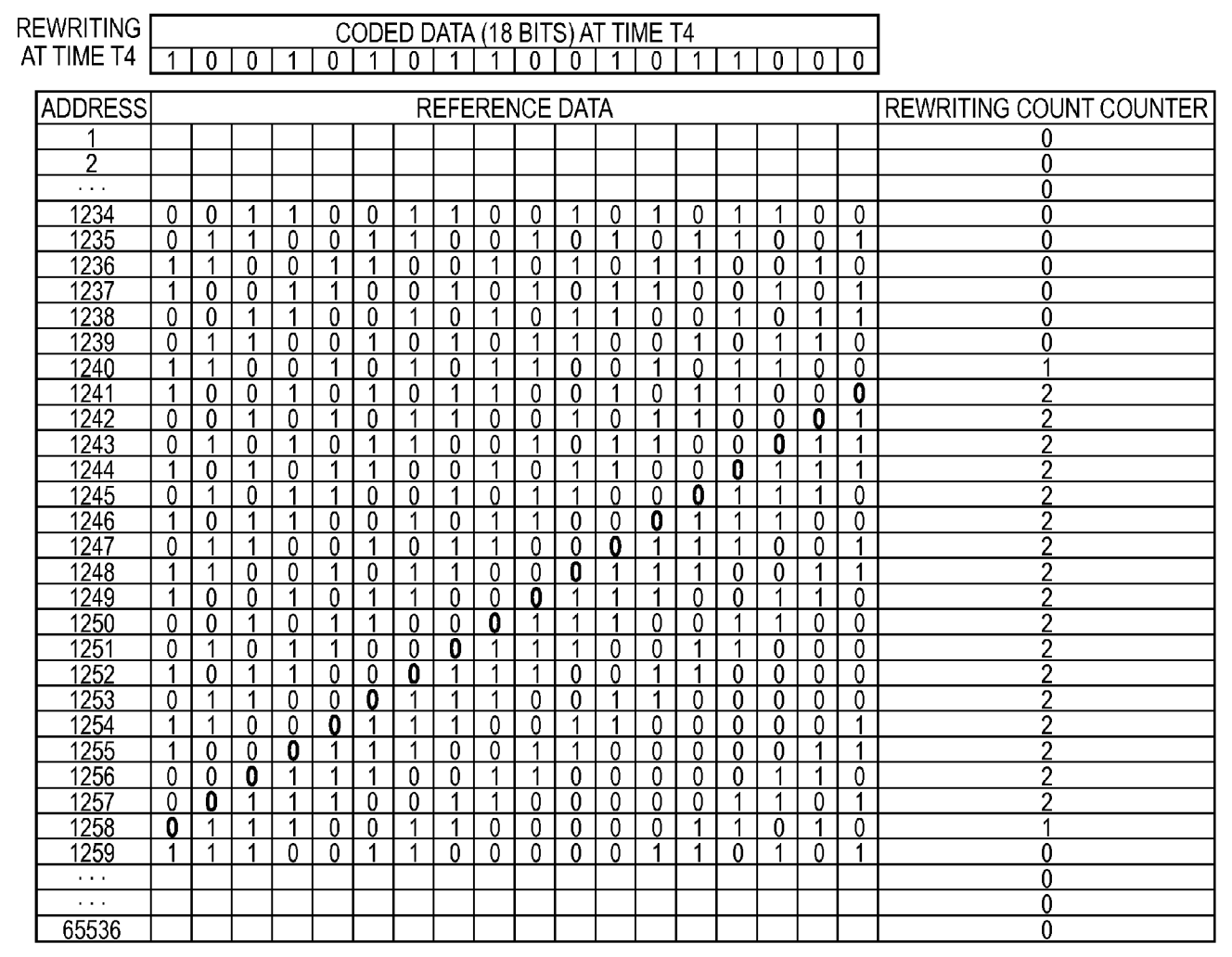
Figure 7:
FIG. 7 is a view for explaining the relationship between a variation in coded data and the collated reference data and rewiring of the reference data.

At the time of the next sampling, the scale has further moved, and thus the error portion caused by a flaw/dust has also moved. Note that the reference data have already been rewritten, as described above. Therefore, if there is no new flaw/dust in the edge portion of the 18-bit data, matched reference data always exists in a newly set search region. Alternatively, if there is another abnormality in the edge portion, the portion of the reference data is rewritten in the same manner, and the corresponding portions of the reference data at 18 addresses following the address are rewritten. With this processing, a portion matching the next reference data always exists. FIGS. 3A, 6A, and 6B show these cases. FIGS. 3B and 7 show a case in which the scale further moves.

As described above, an absolute encoder which outputs absolute position information while rewriting reference data is implemented.

Note that the user is reassured by outputting information indicating that reference data have been rewritten and rewriting count information. In this embodiment, the table of the pure binary converter 104 further includes a field of the rewriting count of reference data at each address. The signal processor SP can count up the rewriting count (112), and output the rewriting count (113). FIGS. 4A to 7 exemplify the value of a rewriting count counter.

According to the above-described first embodiment, the following effects can be obtained.

(1) Even if there is a small defect (flaw/dust) in the scale, it is possible to continuously output correct absolute position information.

(2) Since information of a defect (flaw/dust) in the scale is reflected in reference data, when the reference data is repeatedly used, it is not necessary to take measures (rewriting) against a mismatch of data every time, thereby enabling a high-speed operation.

(3) Since reference data including defect information of the scale is updated, it is possible to perform quality control by extracting the defect information. For example, when the defect rate exceeds a predetermined value, it is possible to determine the time for cleaning or replacement.

<Second Embodiment>

Figure 8:
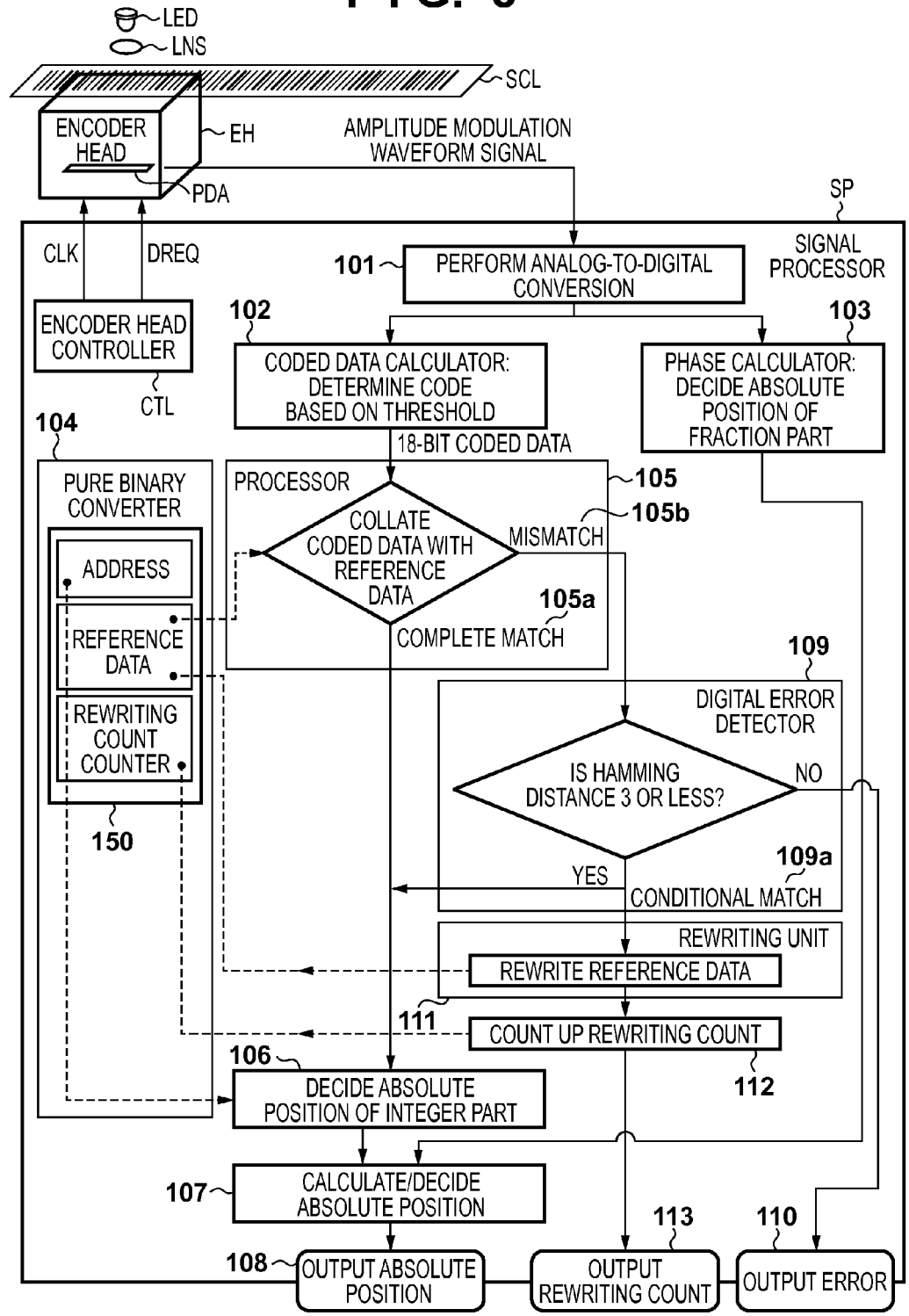
FIG. 8 is a view for explaining the arrangement of an absolute encoder and a signal processing algorithm according to the second embodiment.

FIG. 8 is a view for explaining the arrangement of an absolute encoder and a signal processing algorithm according to the second embodiment. Steps until coded data is acquired are the same as in the first embodiment.

In this embodiment, if there is a flaw or defect in a scale, and no completely matched reference data is found within a search range even by executing a search, a digital error detector 109 calculates a "Hamming distance" indicating the degree of matching of codes. At this time, for example, a reference data sequence having a smallest Hamming distance is adopted, and an address at which the reference data sequence is stored is output as absolute position information. That is, a process of selecting reference data having a smallest Hamming distance from reference data including completely matched reference data (whose Hamming distance is 0) is adopted.

Note that if the Hamming distance exceeds a predetermined upper limit value, an error notification (110) indicating that correct position information cannot be output may be sent. In the flowchart shown in FIG. 8, the upper limit of the Hamming distance is 3 (209).

After the reference data sequence is decided based on the Hamming distance, only a mismatch portion needs to be rewritten, similarly to the first embodiment. The reference data sequence may be always overwritten and saved, as a matter of course. Similarly, it is necessary to rewrite reference data at 18 adjacent addresses. These rewriting operations are performed in about 20 clocks, and completed before next sampling.

At the time of the next sampling, the scale has further moved, and thus the error portion caused by a flaw/dust has also moved. Since, however, the reference data have already been rewritten, if there is no new flaw/dust in the edge portion of the 18-bit data, and a matched portion always exists. Alternatively, if there is another abnormality in the edge portion, the portion of the reference data is rewritten in the same manner, and the corresponding portions of the reference data at 18 addresses following the address are rewritten. As a result, a portion matching the next reference data always exists.

The second embodiment is advantageous in simplifying the algorithm, as compared with the first embodiment.

<Other Embodiments>

In the first and second embodiments, a case in which measurement correctly starts when the scale includes no flaw or dust has been assumed. In fact, however, measurement may start from a portion of the scale where there exists a flaw/dust. Therefore, the following processing may be added.

If coded data for 18 bits including a portion of the scale where there exists a flow/dust is acquired, it does not match reference data at high probability. Therefore, in the first and second embodiments, an error notification indicating that "correct absolute position information cannot be output" is immediately sent. The user of the encoder cleans the portion of the scale or performs processing so as to start from another portion.

However, some reference data including incompletely matched reference data in the second embodiment is erroneously selected, a problem arises. In this case, even if truly incorrect reference data is adopted, no matched reference data is found within a search region in next sampling. In this case as well, it is possible to avoid erroneous use by sending an error notification indicating that "correct absolute position information cannot be output".

Assuming that processing restarts from a portion where reference data was rewritten for a flaw/dust in the scale while the encoder was used in the past, the same reference data may exist in a plurality of portions. To solve this problem, in this embodiment, a mark indicating that a rewriting operation has been performed is added to the reference data. More preferably, a function of recording a rewiring count for each address is provided. Note that the rewritten reference data includes rewritten reference data according to the relationship between the data.

The rewriting count counter is assigned to bits added to the reference data. When a rewriting operation is performed, the count is incremented. When the encoder is operated for the first time, the mark of reference data matching read data is confirmed. If the mark indicates 1 or more, an error notification indicating that "correct absolute position information cannot be output" can be sent, thereby performing processing so as to start from another portion. The rewriting count can also be used as an index of cleaning or replacement of the scale.

By adding the above function to the first or second embodiment, it is possible to use the absolute encoder more safely.

<Development of Embodiments>

Various modifications and changes can be made to the above-described embodiments within the spirit and scope of the present invention. Examples which can be modified or changed will be explained below.

1. In the first and second embodiments, the transmissive scale is used. However, a reflective scale may be used, and the reflectance may be determined according to a code of 1 or 0. Although the optical system projects diverging light onto the scale, and projects an enlarged image onto a light-receiving element array, the optical system can be changed to perform, for example, unit-magnification projection by collimated light illumination, as appropriate. Although the amount of light reaching the light-receiving element is determined according to a code of 1 or 0, a small light amount includes zero.

2. In the first and second embodiments, code demodulation is determined based on the threshold. However, determination may be performed and read data may be acquired by another method of, for example, paying attention to a variation in periodic signal waveform between adjacent data.

3. In the first and second embodiments, the light-receiving element array PDA is configured to detect one "bright-dark" cycle by the 12 light-receiving elements. The number of light-receiving elements which detect one "bright-dark" cycle may be changed to 3, 4, 6, 8, or the like.

4. In the above-described embodiments, waves of the amplitude modulation periodic waveform for 20 periods are captured, 18-bit data of a central portion of 20-bit data demodulated from the waves is set as read data, and a portion where the read data matches reference data is then searched for. However, the number of captured waves of the amplitude modulation periodic waveform and the number of bits of the read data need only be equal to or larger than the number of bits of the M-sequence code, and may be changed to another number.

5. In the above-described embodiments, the M-sequence code is used as a code sequence on the scale. Other cyclic codes and data recording absolute position code information including a set of an address and data can be used. In this case as well, by providing the similar collation process, reference data selection process, a function of confirming and outputting an absolute position corresponding to reference data, and a reference data rewiring function in the pure binary converter, it is possible to prevent erroneous detection caused by a flaw/dust on the scale, in the completely same manner.

6. A detector including a light-receiving element array has been exemplified as a detector 1. The present invention, however, is not limited to this, and the detector can include an array of various elements in accordance with the characteristics of marks formed in a scale 2. That is, the elements may detect any physical amounts corresponding to the characteristics for discriminating a plurality of kinds of marks. Marks of an array of marks formed in the scale includes a plurality of kinds of marks, characteristics of which are different from each other, and are arranged with gaps (spaces or spacings) thereamong. For example, if a plurality of kinds of (permanent) magnets for generating magnetic fields of different strengths are included as the plurality of kinds of marks formed in the scale, the detector 1 can adopt an array of magnetic (magnetic field) detection elements such as Hall elements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-087591, filed Apr. 21, 2014, which is hereby incorporated by reference herein in its entirety.

What is claimed is:

1. An absolute encoder comprising:
    a scale including an array of marks;
    a detector configured to detect a part of the array of marks and output a data sequence corresponding to the part;
    a memory storing information indicating a correspondence between each of a plurality of code sequences and an absolute coordinate of motion of the scale; and
    a processor connected to the memory and configured to:
        detect an error of the data sequence based on a degree of correlation between the data sequence and each of code sequences as a part of the plurality of code sequences in the information;
        perform rewriting of a plurality of code sequences as a part of the plurality of code sequences in the information based on the detected error; and
        output information of the absolute coordinate based on the data sequence and the information.

2. The encoder according to claim 1, wherein the processor is configured to:
    search for a code sequence with respect to the data sequence and determine the absolute coordinate according to a code sequence having a highest degree of correlation with the data sequence;

detect the error by determining a mismatch portion of the code sequence corresponding to the determined absolute coordinate; and perform the rewriting by using the data sequence to overwrite therewith the mismatch portion of the code sequence corresponding to the determined absolute coordinate and corresponding mismatch portions of a plurality of code sequences corresponding to absolute coordinates adjacent to the determined absolute coordinate.

3. The encoder according to claim 1, wherein the processor is configured to detect an error in a predetermined number of most significant bits and a predetermined number of least significant bits in the data sequence.

4. The encoder according to claim 1, wherein the plurality of code sequences is obtained by sequentially shifting and extracting a code sequence from an M-sequence, and a plurality of the absolute coordinates is represented by a plurality of binary codes in one of an ascending order and descending order.

5. The encoder according to claim 4, wherein the absolute coordinate is represented by an address for the memory.

6. The encoder according to claim 1, wherein the processor is configured to output an error based on the degree of correlation.

7. The encoder according to claim 1, wherein the information includes information of number of times of the rewriting with respect to each of the plurality of code sequences.

8. The encoder according to claim 7, wherein the processor is configured to output the information of the number of times.

9. The encoder according to claim 1, wherein the processor is configured to use a Hamming distance as the degree of correlation.

10. The encoder according to claim 1, wherein marks of the array of marks include a plurality of kinds of marks, characteristics of which are different from each other, and are arranged with gaps thereamong.

* * * * *